(12) United States Patent
Abboa-Offei

(10) Patent No.: US 9,143,834 B2
(45) Date of Patent: Sep. 22, 2015

(54) SYSTEM AND METHOD FOR ORGANIZING A MEDIA PROGRAM GUIDE ACCORDING TO POPULARITY

(71) Applicant: Kwabena Abboa-Offei, Boston, MA (US)

(72) Inventor: Kwabena Abboa-Offei, Boston, MA (US)

(73) Assignee: WEW Entertainment Corporation, Brooklyn, NY (US)

( * ) Notice: Subject to any disclaimer, the term of this patent is extended or adjusted under 35 U.S.C. 154(b) by 0 days.

(21) Appl. No.: 13/776,157

(22) Filed: Feb. 25, 2013

(65) Prior Publication Data

US 2013/0227612 A1  Aug. 29, 2013

Related U.S. Application Data

(60) Provisional application No. 61/602,646, filed on Feb. 24, 2012.

(51) Int. Cl.
| | |
|---|---|
| *H04N 5/445* | (2011.01) |
| *H04N 21/482* | (2011.01) |
| *H04N 21/462* | (2011.01) |
| *H04N 21/435* | (2011.01) |
| *H04N 21/443* | (2011.01) |
| *H04N 21/84* | (2011.01) |

(52) U.S. Cl.
CPC ........... *H04N 21/482* (2013.01); *H04N 21/435* (2013.01); *H04N 21/4431* (2013.01); *H04N 21/4622* (2013.01); *H04N 21/4821* (2013.01); *H04N 21/4826* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 5,995,096 A | 11/1999 | Kitahara et al. | |
| 6,954,498 B1 | 10/2005 | Lipton | |
| 7,627,831 B2 | 12/2009 | Chiu et al. | |
| 2005/0229233 A1 | 10/2005 | Zimmerman et al. | |
| 2006/0173838 A1* | 8/2006 | Garg et al. | 707/5 |
| 2007/0240180 A1* | 10/2007 | Shanks et al. | 725/14 |
| 2008/0059580 A1 | 3/2008 | Kalinowski et al. | |
| 2008/0059986 A1 | 3/2008 | Kalinowski et al. | |
| 2008/0104536 A1 | 5/2008 | Mori | |
| 2008/0247650 A1 | 10/2008 | Amir et al. | |
| 2008/0250450 A1* | 10/2008 | Larner et al. | 725/34 |
| 2009/0116702 A1 | 5/2009 | Conradt et al. | |
| 2010/0058220 A1 | 3/2010 | Carpenter | |
| 2010/0088623 A1 | 4/2010 | Ichino | |
| 2010/0329633 A1 | 12/2010 | Lafond et al. | |
| 2011/0289422 A1* | 11/2011 | Spivack et al. | 715/739 |
| 2012/0023534 A1* | 1/2012 | Dasilva et al. | 725/109 |
| 2012/0033950 A1* | 2/2012 | Cordray | 386/296 |
| 2012/0059825 A1* | 3/2012 | Fishman et al. | 707/737 |
| 2012/0124620 A1 | 5/2012 | Nishizawa et al. | |
| 2012/0213490 A1 | 8/2012 | Steiner | |

(Continued)

OTHER PUBLICATIONS

U.S. Appl. No. 61/536,968.*

*Primary Examiner* — Junior Mendoza
(74) *Attorney, Agent, or Firm* — Fish & Richardson P.C.

(57) ABSTRACT

Elements of a media program guide are organized in order of a popularity ranking. The popularity rating may be assigned by assigning values to preference terms, analyzing associations of the preference terms to data related to media programs and assigning the popularity ranking of the media programs based on the associations. Associations of the preference terms to the data may be extracted from social media communications or based on numbers of viewers.

25 Claims, 2 Drawing Sheets

(56) References Cited

U.S. PATENT DOCUMENTS

| | | | |
|---|---|---|---|
| 2012/0254917 A1* | 10/2012 | Burkitt et al. | 725/40 |
| 2012/0290508 A1* | 11/2012 | Bist | 706/10 |
| 2012/0311032 A1* | 12/2012 | Murphy et al. | 709/204 |
| 2012/0323908 A1* | 12/2012 | Herbert et al. | 707/728 |
| 2013/0007792 A1* | 1/2013 | Jeon et al. | 725/14 |
| 2013/0074109 A1* | 3/2013 | Skelton et al. | 725/14 |
| 2013/0191765 A1 | 7/2013 | Andersson Reimer et al. | |
| 2014/0013353 A1* | 1/2014 | Mathur | 725/34 |
| 2014/0089423 A1 | 3/2014 | Jackels | |

\* cited by examiner

| Tue 6/5 | 9:30 PM | 10:00 PM | 10:30 PM | 11:00 PM |
|---|---|---|---|---|
| 2 USA | Nash Bridges | Martin | Living Single | The Perfect Nanny |
| 3 ESPN | Baseball Tonight | Sports Center | | Sports Center |
| 4 LOCAL | Local Programming | | | Local Programming |
| 5 KBWB | Smallville | WB News at Ten | Just Shoot Me | News Digest |
| 6 KETV | Mean Eddie | FOX 6 News | | Seinfeld |
| 7 KNBC | Miss Universe Pageant | | | NBC 7:30 News at 11PM |
| 8 KFMB | AFI's100 Years... 100 Heroes and Villans America's Greatest Sports Characters | | | Local B News at 11PM |
| 10 KGTV | Less Than Perfect | NYPD Blue | | 10 News Nightcast |

FIG. 1

(Prior Art)

SYSTEM AND METHOD FOR ORGANIZING A MEDIA PROGRAM GUIDE ACCORDING TO POPULARITY

CROSS REFERENCE TO RELATED APPLICATIONS

This application claims the priority of U.S. Provisional Patent Application No. 61/602,646 entitled SYSTEM AND METHOD FOR ORGANIZING A MEDIA PROGRAM GUIDE ACCORDING TO POPULARITY which was filed on Feb. 24, 2012 and which is incorporated herein by reference in its entirety.

FIELD OF TECHNOLOGY

The present disclosure is in the field of electronic media communications.

BACKGROUND

In general, electronic and interactive program guides are organized according to timeslot, channel, and the name of the program. FIG. 1 is an example of a prototypical interactive program guide organized according to timeslot, program and channel.

SUMMARY

Aspects of the present disclosure include a method and apparatus for organizing a media program guide to be accessed via television, computer, wireless devices, and including, but not limited to, web-television and other such devices. According to one aspect of the present disclosure, the method includes assigning a multidimensional popularity ranking of media programming and organizing elements of the media program guide in order of the popularity ranking either in real-time or based on historical popularity values. The method may also include steps of assigning values to preference terms, analyzing associations of the preference terms to data related to media programs; and assigning the popularity ranking of the media programs based on the association. The method may include extracting the associations of the preference terms to the data from social-media communications, while media programs are being broadcast or televised, and/or assigning the popularity ranking of the media programs based on social media activities regarding the media programs. Therefore, what is disclosed, in one illustrative embodiment, is a media-program guide that, in real-time, automatically re-orders available programming choices, across time zones and cable providers, based largely on an instantaneous lexical analysis of social-media chatter about said media programs—and about the celebrities and personalities featured in those media programs—so that users will be immediately aware of which currently-available media-programming choices are exciting and interesting to either (1) the viewing population in general (2) particular demographic groups, or (3) various interest groups within the viewing population. Therefore, in one said illustrative embodiment, the media-programming guide is organized based on a real-time social-media lexical analysis regarding media programming, as opposed to a listing driven purely by timeslot and channel.

According to another aspect of the present disclosure, the method for organizing a media program guide may include assigning the popularity ranking of the media programs based on a number of viewers currently viewing the programming or assigning the popularity ranking of the media programs based on a historical number of viewers of the programming. For example, according to aspects of the present disclosure, assigning the popularity ranking of the media programs may be based on the number of viewers currently viewing the programming via on-line streaming or may be based on the number of viewers currently viewing the programming via web-TV.

This has outlined, at least in part, features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 1 is a diagram of a media program guide.

DETAILED DESCRIPTION

Figure 2:
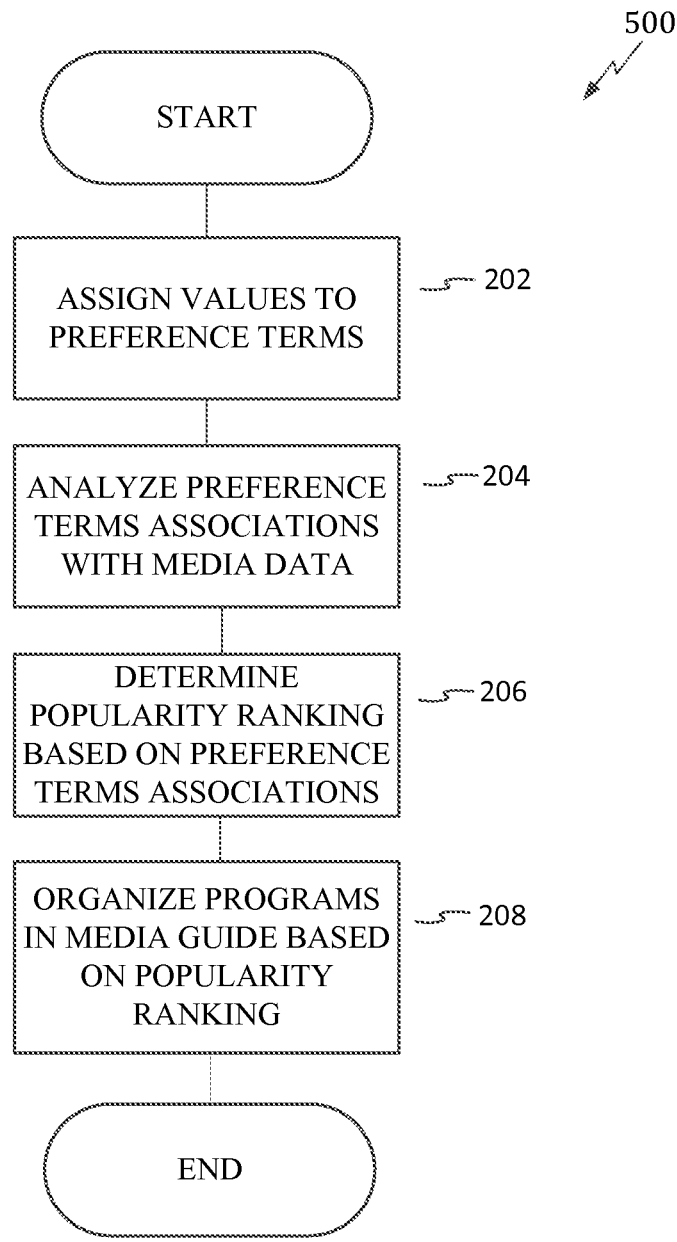
FIG. 2 is a process flow diagram of a method for organizing a media program guide according to aspects of the present disclosure.

Detailed embodiments of systems and method for organizing a media program guide according to popularity, time slot, and category are disclosed herein, however, it is to be understood that the disclosed embodiments are merely exemplary of the systems and methods disclosed herein, which may be embodied in various forms. Therefore, specific functional details disclosed herein are not to be interpreted as limiting, but merely as a basis for the claims and as a representative basis for teaching one skilled in the art to variously employ the disclosure.

The systems and methods disclosed include one or more Application Program Interfaces (APIs) configured to reorganize listings of various types of Network broadcasts, Cable TV broadcasts, Internet-Based broadcasts, and other broadcasts of the type (hereafter, "media programs") according to popularity, timeslot, genre, and various other special interests.

Generally, the systems and methods disclosed herein include and the API is implemented within a computer system, network of computer systems, one or more mobile devices, having one or more databases and other storage apparatuses, servers, networks, and additional components, for example, processors, modems, terminals and displays, wireless displays, computer-readable media, algorithms, modules, and other computer-related components. In an illustrative embodiment, the computer systems are especially configured, programmed, and adapted to perform the functions and processes of the systems and methods and the API as disclosed herein.

Communications between components in the systems and methods disclosed herein may be unidirectional or bidirectional electronic communication through a wired or wireless configuration or network. For example, one component may be wired or networked directly, indirectly, through a third-party intermediary, wirelessly, for example over the Internet, or otherwise with another component to enable communication between the components.

In an illustrative embodiment, the API collects and/or maintains a master list of data, including, but not limited to:
1) The API collects and/or maintains a master list of various media programs, media personalities, products and services, and other data of the type.
2) The API collects and/or maintains a master list, or index, of preference terms, including, but not limited to, standard-english words, forgien-langauge words, slang words, adjectives, and abbreviations that are commonly used to describe or express preferences, likes, and dislikes, for example, but not limited to, like, hate, love, OMG, amazing, gorgeous, hot, sexy, pretty, beautiful, useful, and other terms of the type.
3) The API collects and/or maintains a master list, or index, of media programs, media program scheduling data, cast lists (for example actors in those media programs), player rosters, coaching staff, and owners, metadata about the genre of the program, and other data of the type.

In an illustrative embodiment, the API collects media program scheduling data. To collect the media program-scheduling data the API may employ one or more crawlers or web crawlers. The media program scheduling data may be collected from, for example, but not limited to, Tribune TV Data, Gemstar-TV Guide/Rovi Corporation, FYI Television, Inc, and IMDB, and others. The API may collect the names of media programs, the genere of the media programs, the names of actors, broadcasters, coaches, athletes, and personalities on those media programs, and names of the characters in the media programs. The API may also associate the names of the characters in the media programs to the actors/actresses that play those characters. The API may also include a real-time feed or dynamic feed of such data allowing the data to be updated with media-program or television seasons, day-light-savings time, breaking news pre-emptions, and other changes of the type.

In an illustrative embodiment, the API assigns values to each preference term. The API may assign the same value to preference terms that are generally considered to be synonyms.

In an illustrative embodiment, the API identifies documented public APIs, private APIs, and various other data repositories (hereafter, the "target APIs") and uses programmatic controllers to interface with the target APIs for the purpose of crawling, analyzing, requesting and extracting specific data contained therein (hereafter, "the analyzed data") and transferring the extracted data to the API for "processing," which is described below in further detail.

The target APIs may be, for example, but not limited to, Hulu, Facebook, Youtube, Veemo, Twitter, ITunes, Tumblr, Nielsen's BuzzMetrics, and any chatroom or social media platform where users share opinions and information with natural language, ranking systems, and ratings systems.

In an illustrative embodiment, the API analyzes when users of the target APIs type certain preference terms in close proximity to names of television shows, actors and actresses, players, coaches, etc. It should be appreciated that more than one API may be used to analyze the target APIs, as each of the different target APIs may require a different API.

The analyzed data may include, but is not limited to: (1) the names of media programs, (2) the actors and actresses in those media programs, (3) the preference terms, (4) the number of users who have typed one or more preference terms within a defined proximity to the name of an actor, actress, name of a character in a media program, or the name of a media program, and demographic information about those users. The API may analyze the above information, for example, but not limited to, in real-time, on a periodic basis, while a media program is airing, prior to a media program airing, and after a media program has aired.

In an illustrative embodiment, the API analyzes the proximity of the preference terms to the name of a media program, media personality, and other data of the type. The API may then associates the value assigned to the preference term with the media program, media personality, product, or service prior to extraction (in another illustrative embodiment, however, the function of assigning a value for said preference terms could occur when the terms are first indexed).

In an illustrative embodiment, the API counts the number of times per given time interval that a preference term is typed by an aggregate number, or a defined group, of users, bloggers, or program viewers within a specified proximity to the name of a media program or media personality. The API may also the number of times per given time interval that the name of a media program or media personality is typed or mentioned.

In an illustrative embodiment, the API maintains a list of the IP addresses (the term "IP addresses" shall be used as an illustrative example that, for ease of reference, includes references to all numerical labels, stored-text files, cookies, various internet protocols, wireless or wifi signatures, or binary numbers or protocols that may be used to identify, or locate, a particular user or a computing device) of the users that are using the preference terms that are in close proximate to the names. The API associates the demographic information of users with the IP addresses of those users for the purpose of (a) saving user-preference conclusions, (b) ranking and listing programming selections within the media-programming guide in light of those conclusions, and (c) potentially marketing to users based on their respective preference conclusions.

In an illustrative embodiment, the API automatically creates one or more charts of preference conclusions about given media personalities, media programs, products, and services. In one example, in the context of a media program, the API (a) analyzes how many times per given time interval users have typed a preference term "love," or another preference term of an assigned equivalent value, within two words of "Mad Men" (the title of a popular cable television show) or within two words of the names of actors and actresses that appear in Mad Men, (b) the API associates "Mad Men" with the numerical value assigned to the preference term "love," and (c) the API counts the number of times per given time interval that Mad Men has been associated with "love" or the equivalently valued terms.

The API performs the steps above for all selected media programs, and then the API lists the media programs on a chart in the order of sum total of the preference values that have been associated with those media programs.

In an illustrative embodiment, the API also gathers data from one or more public APIs, private APIs, and various other data repositories to determine the ranking value, or preference value, for the purpose of analyzing the preferences of one or more viewers.

In an illustrative embodiment, the API aggregates the data described above about various media programs collected from the various public APIs, private APIs, and various other data repositories for the purpose of ranking media programs according to popularity on a yearly, a monthly, a weekly, a daily, and/or a real-time basis during the program's airtime.

In an illustrative embodiment, the API automatically generates reports, for example in one or more forms, including, but not limited to excel spreadsheets, pdfs, and electronic program guides that compare and contrast how frequent preference terms are used in conjunction with the names of various media programs, and the actors and actresses in those media programs, before, during and after those programs air.

The API may then list the media programs, on a media programming guide, not solely by channel, but also by popularity and ranking among users, and by genre on a yearly, a monthly, a weekly, a daily, and/or a real-time basis during the program's airtime. This allows the API to present to a user, for example, via a Graphical User Interface (GUI), an electronic and interactive program guide that is organized according to popularity, timeslot, and/or category.

Some examples of rules that may be used by the API to analyze the popularity of media shows may include:
1) For various cast members calculate how many times while a media program is airing that the following occurs: a preference term, physical attribute or product is found within 5 words of an actor's name/character's name or a media program name and shortly after on a target API.
2) Generate a positive point hit if a user provides the following inputs on a target API while a media program X is airing: "John is a great attorney." This generates a positive point hit because John is a character on the media program X, and his name occurs within three words of the preference term "great."
3) For various villains calculate how many times while a media program is airing that the following occurs: a negative preference term is found within 5 words of an actor's name/character's name or a television program name on a target API.
4) For athletic contests calculate how many times while a game is airing that the following occurs: an athlete's name or a team's name or a coach's name is found on a target API.
5) For athletic contests calculate how many times while a game is airing that the following occurs: an athlete's name or a team's name or a coach's name is found within 5 words of a preference term on a target API.
6) Monitor other types of positive mentions: "likes", stars and etc.
7) Assign a point for each occurrence of the above.
8) Assign additional points for velocity of the occurrences. For example, media programs where the occurrences of the above are closer in time should have higher rankings
9) In addition, in one illustrative embodiment, said media-program guide may be ordered according to various categories, like, for example, which program casts are found, after a lexical analysis of preference terms, to be the most physically attractive, the best dressed, or the best dramatic actors relative to other program casts.

One aspect of the present disclosure is described with reference to the process flow diagram shown in FIG. 2. According to this aspect of the present disclosure, the method includes assigning values to preference terms in block 202 and analyzing associations of the preference terms with media data in block 204. The method also includes determining popularity rankings of media based on the preference terms in block 206 and organizing programs in a media guide based on the popularity ranking in block 208.

Although the term application programming interface (API) is used herein to describe various aspects of the present disclosure, it should be understood that the various aspects of the present disclosure may also be performed or configured using hardware and/or software modules that may not include every element of an application programming interface. For example it should be understood that aspects of the present disclosure may include modules and devices that can be implemented outside of the context of an API.

While the systems and methods disclosed herein have been described and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure. Moreover, unless specifically stated any use of the terms first, second, etc. do not denote any order or importance, but rather the terms first, second, etc. are merely used to distinguish one element from another.

What is claimed is:
1. A method comprising:
obtaining, by one or more processing devices from one or more databases stored in computer memory, names associated with media programming;
identifying, by one or more processing devices, one or more words in electronic communications that are part of a network, at least some of the electronic communications occurring during airing of the media programming by one or more service providers over one or more communications media;
during airing of the media programming, determining, by one or more processing devices, a score based, at least in part, on a number of occurrences of the words appearing in proximity to the names in the electronic communications and based, at least in part, on velocities of the occurrences, where velocity comprises a closeness in time of the occurrences of the words;
during airing of the media programming, assigning, by one or more processing devices, a popularity ranking of the media programming based, at least in part, on the score determined by one or more processing devices;
during airing of the media programming, organizing, by one or more processing devices, elements of a media program guide in an order that is based on the popularity ranking, the elements identifying the media programming; and
outputting, by one or more processing devices, data corresponding to the media program guide for generating the media programming guide on one or more display devices during airing of the media programming.
2. The method of claim 1, further comprising:
assigning, by one or more processing devices, values to the words;
wherein the score is based also on the values.
3. The method of claim 2, wherein the electronic communications comprise social media communications;
wherein the network comprises a social network over which the social media communications are transmitted; and wherein the score is also based on a grammatical affiliation between the words and the names.

4. The method of claim 1, wherein the popularity ranking is based also on social media activities regarding the media programming.

5. The method of claim 1, wherein the popularity ranking is based also on a number of viewers viewing the media programming.

6. The method of claim 1, wherein the popularity ranking is based also on a number of viewers viewing the programming via on-line streaming.

7. The method of claim 1, wherein the popularity ranking is based also on a number of viewers viewing the media programming via web-TV.

8. The method of claim 1, wherein the popularity ranking is based on a historical number of viewers of the media programming.

9. One or more non-transitory machine-readable storage devices storing instructions that are executable by one or more processing devices to perform operations comprising:
   obtaining, by the one or more processing devices from one or more databases stored in computer memory, names associated with media programming;
   identifying, by the one or more processing devices, one or more words in electronic communications that are part of a network, at least some of the electronic communications occurring during airing of the media programming by one or more service providers over one or more communications media;
   during airing of the media programming, determining, by the one or more processing devices, a score based, at least in part, on a number of occurrences of the words appearing in proximity to the names in the electronic communications and based, at least in part, on velocities of the occurrences, where velocity comprises a closeness in time of the occurrences of the words;
   during airing of the media programming, assigning, by the one or more processing devices, a popularity ranking of the media programming based, at least in part, on the score determined by one or more processing devices;
   during airing of the media programming, organizing, by the one or more processing devices, elements of a media program guide in an order that is based on the popularity ranking, the elements identifying the media programming; and
   outputting, by the one or more processing devices, data corresponding to the media program guide for generating the media programming guide on one or more display devices during airing of the media programming.

10. The one or more non-transitory machine-readable storage devices of claim 9, wherein the operations comprise:
   assigning, by one or more processing devices, values to the words;
   wherein the score is based also on the values.

11. The one or more non-transitory machine-readable storage devices of claim 10, wherein the electronic communications comprise social media communications;
   wherein the network comprises a social network over which the social media communications are transmitted; and
   wherein the score is also based on a grammatical affiliation between the words and the names.

12. The one or more non-transitory machine-readable storage devices of claim 9, wherein the popularity ranking is based also on social media activities regarding the media programming.

13. The one or more non-transitory machine-readable storage devices of claim 9, wherein the popularity ranking is based also on a number of viewers viewing the media programming.

14. The one or more non-transitory machine-readable storage devices of claim 9, wherein the popularity ranking is based also on a number of viewers viewing the programming via on-line streaming.

15. The one or more non-transitory machine-readable storage devices of claim 9, wherein the popularity ranking is based also on a number of viewers viewing the media programming via web-TV.

16. The one or more non-transitory machine-readable storage devices of claim 9, wherein the popularity ranking is based on a historical number of viewers of the media programming.

17. A system comprising:
   one or more non-transitory storage devices storing instructions that are executable; and
   one or more processing devices to execute the instructions to perform operations comprising:
   obtaining, by the one or more processing devices from one or more databases stored in computer memory, names associated with media programming;
   identifying, by the one or more processing devices, one or more words in electronic communications that are part of a network, at least some of the electronic communications occurring during airing of the media programming by one or more service providers over one or more communications media;
   during airing of the media programming, determining, by the one or more processing devices, a score based, at least in part, on a number of occurrences of the words appearing in proximity to the names in the electronic communications and based, at least in part, on velocities of the occurrences, where velocity comprises a closeness in time of the occurrences of the words;
   during airing of the media programming, assigning, by the one or more processing devices, a popularity ranking of the media programming based, at least in part, on the score determined by one or more processing devices;
   during airing of the media programming, organizing, by the one or more processing devices, elements of a media program guide in an order that is based on the popularity ranking, the elements identifying the media programming; and
   outputting, by the one or more processing devices, data corresponding to the media program guide for generating the media programming guide on one or more display devices during airing of the media programming.

18. The system of claim 17, wherein the operations comprise:
   assigning, by one or more processing devices, values to the words;
   wherein the score is based also on the values.

19. The system of claim 18, wherein the electronic communications comprise social media communications;
   wherein the network comprises a social network over which the social media communications are transmitted; and
   wherein the score is also based on a grammatical affiliation between the words and the names.

20. The system of claim 18, wherein the electronic communications comprise social media communications;
   wherein the network comprises a social network over which the social media communications are transmitted; and wherein the there is a grammatical association, based on sentence structure, between the words that are one or more preference term and at least some information that includes the names.

21. The system of claim 17, wherein the popularity ranking is based also on social media activities regarding the media programming.

22. The system of claim 17, wherein the popularity ranking is based also on a number of viewers currently viewing the media programming.

23. The system of claim 17, wherein the popularity ranking is based also on a number of viewers viewing the media programming via on-line streaming.

24. The system of claim 17, wherein the popularity ranking is based also on a number of viewers viewing the media programming via web-TV.

25. The system of claim 17, wherein the popularity ranking is based on a historical number of viewers of the media programming.

\* \* \* \* \*

UNITED STATES PATENT AND TRADEMARK OFFICE
CERTIFICATE OF CORRECTION

Page 1 of 1

PATENT NO.         : 9,143,834 B2
APPLICATION NO.    : 13/776157
DATED              : September 22, 2015
INVENTOR(S)        : Kwabena Benoni Abboa-Offei It is certified that error appears in the above-identified patent and that said Letters Patent is hereby corrected as shown below:

In the claims;
Column 9, Line 1, In Claim 20, after "wherein" delete "the".

Signed and Sealed this
Fifteenth Day of March, 2016

Michelle K. Lee
*Director of the United States Patent and Trademark Office*